(No Model.)
G. W. GOETZ, Dec'd.
E. GOETZ, A. W. GOETZ, JR. & A. S. GOETZ, Executors.
PROCESS OF EXTRACTING COPPER FROM ITS ORES.
No. 581,910. Patented May 4, 1897.
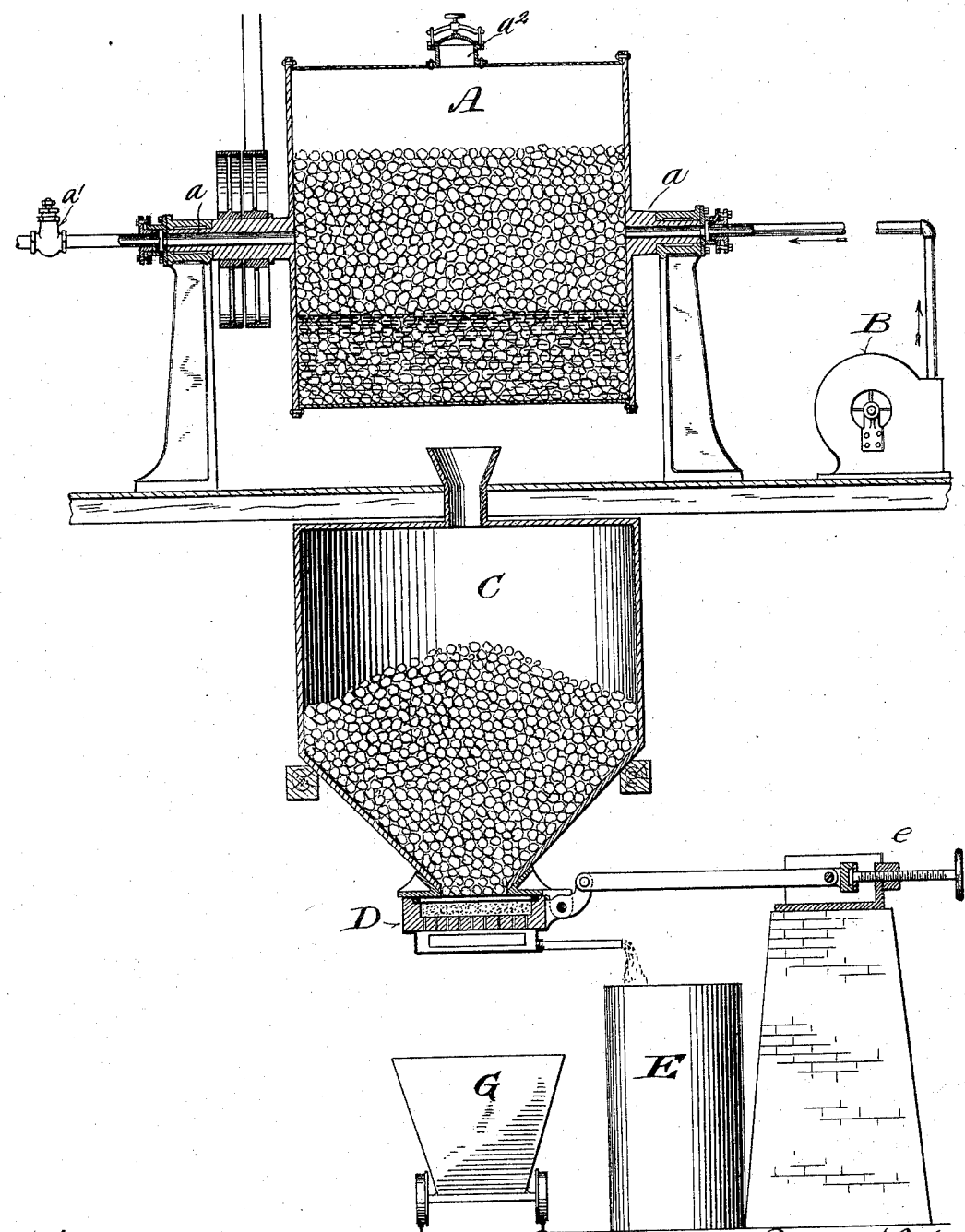

UNITED STATES PATENT OFFICE.

GEORGE W. GOETZ, OF MILWAUKEE, WISCONSIN; ELSE GOETZ, AUGUST W. GOETZ, JR., AND ARTHUR S. GOETZ EXECUTORS OF SAID GEORGE W. GOETZ, DECEASED.

PROCESS OF EXTRACTING COPPER FROM ITS ORES.

SPECIFICATION forming part of Letters Patent No. 581,910, dated May 4, 1897.

Application filed June 26, 1896. Serial No. 597,052. (No specimens.)

*To all whom it may concern:*

Be it known that I, GEORGE W. GOETZ, of Milwaukee, in the county of Milwaukee and State of Wisconsin, have invented certain new and useful Improvements in Processes of Extracting Copper from its Ores; and I do hereby declare that the following is a full, clear, and exact description of the invention, which will enable others skilled in the art to which it pertains to make and use the same.

It is well known that copper oxids have been dissolved by placing them in a solution of sulfate of iron and chlorid of sodium, a quite strong solution being generally employed, although the strength of the solution may widely vary and yet produce the required result. The mixed solution of sulfate of iron and chlorid of sodium will dissolve the oxids of copper, and metallic copper may be precipitated from the solution by introducing metallic iron, usually in the shape of scrap-iron. The introduction of the metallic iron causes the copper to be precipitated in a finely-divided state, which is ordinarily called "cement-copper."

The process just described is known in metallurgy as the Hunt and Douglas process.

My process consists in an improvement upon this process, permitting me to bring into solution not only copper oxids, as the Hunt and Douglas process will only do, but also metallic copper and sulfid of copper.

The above-mentioned mixture of sulfate of iron and chlorid of sodium, forming chlorid of iron with an excess of the chlorid of sodium, does not ordinarily act upon metallic copper or sulfid of copper.

It has been attempted to extract copper tailings containing metallic copper by first roasting them, so as to oxidize the copper, but it has been found that the oxidation was incomplete, the coating of oxid formed by roasting protecting the interior of the copper from further oxidation in the furnace, and when the solution as ordinarily employed is applied to the roasted tailings only the exterior covering of copper oxid is dissolved, leaving the metal intact, or so very slightly acted upon that the process is useless for the purposes of extraction. Metallic copper or sulfid of copper is not acted upon, or only slightly so, in a solution of sulfate or chlorid of iron and chlorid of sodium by exclusion of air, even if the mixture of ore and solution are violently agitated by mechanical means, because hardly any oxidation can take place.

By subjecting the ore or tailings containing metallic copper or sulfid of copper, as well as the solutions mentioned below, to strongly oxidizing influences the copper present goes into solution and can then be separated from the earthy matter or non-metallic portions of the ore or tailings.

In my improved process I take a solution of sulfuric acid ($H_2SO_4$) and chlorid of sodium, (NaCl.) Any other chlorids—such as chlorid of calcium or magnesium or iron, which set free hydrochloric acid (HCl)—can be used, as well as hydrochloric acid alone in solution; but I prefer to use the chlorid of sodium and sulfuric acid, as mentioned above. Into the aqueous solution of sulfuric acid and chlorid of sodium I introduce a quantity of copper tailings or ore, which consists either of finely-divided metallic copper or sulfid of copper and the dross, rock, or matrix (gangue) in which it is found.

The copper-bearing materials and the solution are placed in a rotating barrel. The barrel is closed tightly, so that none of the ore or solution can run out. The barrel should be of sufficient size to hold a large volume of air in addition to the solution and the copper-bearing ore or tailings. To provide the requisite supply of air, it may be compressed into the barrel, or a current of air may be passed through the barrel by leading it in and out through the trunnions on which the barrel turns. In either event it is held above atmospheric pressure. The air and the solution to which it is alternately subjected cause a rapid solution of the copper in the tailings or ore as soon as the barrel is slowly rotated, and especially so when the solution is heated. After sufficient time has elapsed to dissolve the copper I separate the solution from the earthy matters by allowing the latter to settle or by filtration, and then add to the solution scrap-iron, which causes the copper to precipitate as cement-copper. The quantity of iron added is preferably largely in excess of the copper and in forms affording as great a surface as possible, in order to expedite the precipitation of the copper. The solution thus deprived of copper can be used on fresh ore or tailings.

The air oxidizes the metallic copper, and the oxid of copper formed is dissolved by the hydrochlorid acid, forming chlorid and subchlorid of copper. The chlorid of copper thus formed is reduced by metallic copper to subchlorid, so that ultimately the solution will hold principally subchlorid of copper.

The subchlorid is insoluble in the solution, as there is not sufficient chlorid of sodium present to hold it in solution. Some of the subchlorid of copper is oxidized by the air becoming oxychlorid, which is also insoluble in the solution. Consequently the solution ultimately contains in suspension in a finely-divided state the copper principally as subchlorid and oxychlorid, which can be easily removed from the coarse ore or matrix by decantation.

The chlorids of copper are easily reduced by metallic iron to metallic copper with soluble chlorids of iron.

When any ferrous chlorid is present, this also acts on the oxychlorid and oxid of copper, forming some chlorid of copper (which can again act on metallic copper) with the precipitation of sesquioxid of iron.

It will be noticed that in order to bring about the above reactions, with the object of bringing into solution the copper in the ore, the presence of air or oxygen is absolutely necessary. Without the air or oxygen most of the reactions will not take place. It is therefore of prime importance that the copper to be dissolved should come into intimate contact with air or oxygen after it is moistened with the above-mentioned liquors. In order to bring this about, the process is carried out as follows: A quantity of copper ore or tailings is placed in a rotating drum or barrel and then a solution is added consisting of water, sulfuric acid, and salt, the quantity of sulfuric acid and salt depending on the percentage of copper to be extracted. If, for instance, the ore contains two per cent. of copper to the ton, sixty pounds of ordinary chamber sulfuric acid and about eighty pounds of common salt are sufficient to extract the copper. Hot solutions act faster than cold ones. When the barrel is rotated, all the ore particles are frequently brought into contact with air and then again with the dissolving solution. By rotation the solution is also oxidized by presenting a large surface to the air.

Experience has shown that the larger the surfaces presented to the air the quicker and more efficient will be the process.

After the percentage of copper desired is in solution the barrel is opened and the solution is decanted from the ore. The solution is then brought into tanks containing metallic iron, by contact with which it is deprived of its copper. The solution freed of copper can be used to advantage for the next charge of ore.

United States Letters Patent No. 519,111, dated May 1, 1894, were granted to me for a process of extracting copper from its ores, which is somewhat similar to my present process, but although my former process works well it has been found that under certain conditions it is not practicable to blow air through the solution and at the same time to bring about an intimate contact of the solution being blown through and the ore or tailings, as certain ores and tailings on account of their size and weight would require a too powerful blast to keep them in suspension, whereas when the ores or tailings are placed in a slowly-rotating barrel the solution and ore are brought into intimate contact with each other, as well as with the air or oxygen contained in the barrel.

It will be obvious to those familiar with the art to which my invention pertains that although the reactions are quite complex which take place as mentioned above as much chlorin must be present, either in chlorid of iron, hydrochloric acid, a mixture of sulfuric acid and chlorid of sodium, as is equivalent to the copper in the form of subchlorid of copper, and in order to have efficient solutions that those solutions and the ore or tailings must be subject to the strongly-oxidizing influence of air or oxygen.

In the accompanying drawing, forming a part of my specification, and illustrating apparatus suitable for the practice of my improved process hereinbefore described, A designates a rotating drum, the trunnions $a$ $a$ of which are hollow, so that air can be forced by a pump or blower B into the barrel through one trunnion and pass out through the other and thereby keep the entire space not occupied by the ore and solution constantly supplied with air. A space is left in the barrel above the ore for holding a considerable volume of air and permitting a free tumbling movement and agitation of the ore when the barrel is rotated, and the barrel is supplied with solution to a level considerably below the top of the ore, so that both ore and solution are constantly subjected to the action of the air, and as the barrel is rotated all the ore and solution will be affected thereby. The air-outlet connection of the barrel may be provided, as shown, with a pressure-regulating valve $a'$, whereby the passage of the air out of the barrel is retarded or throttled and a constant pressure above that of the atmosphere is maintained in the barrel. In this way the oxidizing effect of the air upon the ore and solution is greatly accelerated.

The ore and solution are charged through an opening $a^2$, which is tightly closed by a cover clamped or otherwise secured to the barrel. When the solution of the copper in the ore has taken place, the contents of the barrel are discharged through the opening $a^2$, turned for the purpose to the under side, into the separating-receptacle C, from which the solution and matter suspended in it percolate through the filter D, flowing therefrom into precipitating-tanks E. In these tanks the copper oxids suspended in the solution are treated with scrap-iron and reduced to metallic copper. When the solution has been drained from the ore or matrix in the receptacle C, the filter D is swung or removed from the discharge-opening thereof by the screw device e or other suitable means, and the contents of said receptacle are discharged into a car G to be dumped on the waste-pile.

I do not wish to be understood as limiting myself to the particular apparatus hereinbefore described for carrying out my process, as any device or apparatus whereby the copper ore or tailings may be held in constant contact with the dissolving solution and with air or oxygen at a pressure above that of the atmosphere will serve the purpose.

I claim—

1. The process of extracting copper from tailings or ore, which consists in subjecting the tailings or ore in a rotating receptacle continuously to a solution containing hydrochloric acid, and to air or oxygen, separating the solution containing copper salts in suspension from the ore or matrix, and finally reducing the copper salts by metallic iron to metallic copper, substantially as and for the purposes set forth.

2. The process of extracting copper from tailings or ore, which consists in subjecting the tailings or ore continuously to the action of a solution containing substances such as a mixture of sulfuric acid and a chlorid that will yield chlorin or hydrochloric acid, and to air or oxygen above atmospheric pressure, separating the solution containing copper salts in suspension from the ore or matrix, and finally reducing the copper salts by metallic iron to metallic copper, substantially as and for the purposes set forth.

3. The process of extracting copper from tailings or ore, which consists in agitating and continuously subjecting in a closed receptacle the tailings or ore containing the copper to the action of a solution containing a mixture of sulfuric acid and chlorid of sodium, and to air or oxygen, until sufficient copper is held in the solution, then separating the earthy matter from the solution and finally precipitating the copper held in the solution by means of metallic iron, substantially as and for the purposes set forth.

In testimony that I claim the foregoing as my own I affix my signature in presence of two witnesses.

GEORGE W. GOETZ.

Witnesses:
  E. V. WRIGHT,
  CHAS. L. GOSS.